United States Patent [19]

Wei

[11] Patent Number: 5,852,923
[45] Date of Patent: Dec. 29, 1998

[54] INTERCHANGEABLE HEAD FOR A RAKE

[76] Inventor: Ming-Tien Wei, P.O. Box 453, Taichung, Taiwan

[21] Appl. No.: 761,790

[22] Filed: Dec. 6, 1996

[51] Int. Cl.⁶ .................................................. A01D 7/00
[52] U.S. Cl. .................................. 56/400.18; 56/400.19; 56/400.2
[58] Field of Search ........................... 56/400.18, 400.19, 56/400.2

[56] References Cited

U.S. PATENT DOCUMENTS

| | | | |
|---|---|---|---|
| 2,032,954 | 3/1936 | Reichard | 56/400.18 |
| 3,258,903 | 7/1966 | Rienacker et al. | 56/400.18 |
| 3,394,536 | 7/1968 | Henne | 56/400.18 |
| 3,701,243 | 10/1972 | Durkee | 56/400.18 |
| 3,750,379 | 8/1973 | Huspen | 56/400.18 |
| 4,901,515 | 2/1990 | Mclead et al. | 56/400.18 |
| 5,553,447 | 9/1996 | Hsu | 56/400.18 |
| 5,626,009 | 5/1997 | Bower et al. | 56/400.06 |

*Primary Examiner*—J. Woodrow Eldred
*Attorney, Agent, or Firm*—Harrison & Egbert

[57] ABSTRACT

An rake is provided with a interchangeable head comprising a main body having a plurality of prongs attached thereto. The main body further has a neck opposite in location to the prongs for fastening a handle of the rake. The neck is provided with a movable press rod which is fastened pivotally therewith and is provided with a protruded surface. The neck is further provided with a movable press piece for fastening pivotally the press rod. The main body is provided with a protective slot for enclosing the pointed ends of the prongs.

2 Claims, 6 Drawing Sheets

INTERCHANGEABLE HEAD FOR A RAKE

FIELD OF THE INVENTION

The present invention relates generally to a rake, and more particularly to a head of the rake.

BACKGROUND OF THE INVENTION

As shown in FIGS. 1 and 2, a prior art interchangeable head of the rake comprises a main body 1 which is provided with a stopping wall 11 with a plurality of prongs 12 attached thereto. The prongs 12 are located by a press piece 13. The main body 1 is fastened with a neck 14 having a mounting hole 15 which is provided axially with a support section 16. A press block 17 is located such that it is opposite to the mounting hole 15. The press block 17 is provided with a retaining slot 170 corresponding in location to and engageable with the support section 16. A press rod 18 is corresponding in location to the press block 17 and is provided with a planar surface and an arcuate surface. The neck 14 is intended to engage a handle 19 such that the main body 1 is movable in relation to the handle 19. As the press rod 18 is turned such that its arcuate surface is corresponding in location to the press block 17, the handle 19 is pressed and located securely by the bottom of the press block 17.

The prior art movable head described above is defective in design in that its mechanism for locating the handle 19 comprises the support section 16, the press block 17 and the press rod 18, which are all too complicated in construction and are therefore not cost-effective. In addition, the prongs 12 of the movable head are safety hazards capable of inflicting a wound on a person.

SUMMARY OF THE INVENTION

It is therefore the primary objective of the present invention to provide a rake with a interchangeable head having a press piece which can be actuated by a a rotatable press rod to hold securely the handle of the rake. The interchangeable head is simple in construction and is therefore cost-effective.

It is another objective of the present invention to provide a rake with a interchangeable head having a protective slot for enclosing the pointed ends of the prongs, so as to minimize the risk of a bodily injury inflicted on a person by the rake prongs.

The foregoing objectives, features, functions, and advantages of the present invention will be more readily understood upon a thoughtful deliberation of the following detailed description of the embodiment of the present invention in conjunction with the accompanying drawings.

DETAILED DESCRIPTION OF THE EMBODIMENT

Figure 1:
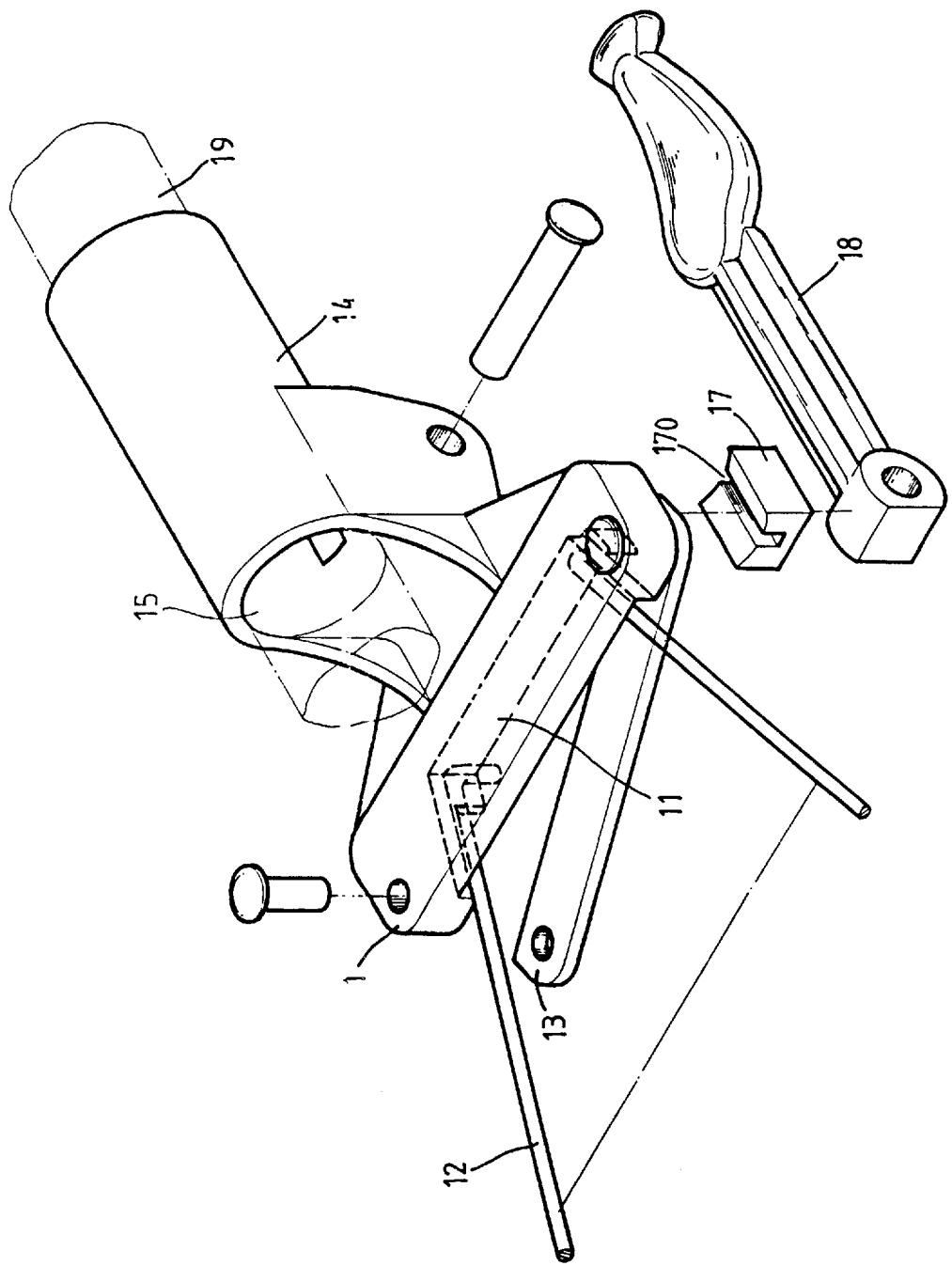
FIG. 1 shows an exploded view of a prior art interchangeable head of the rake.
Figure 2:
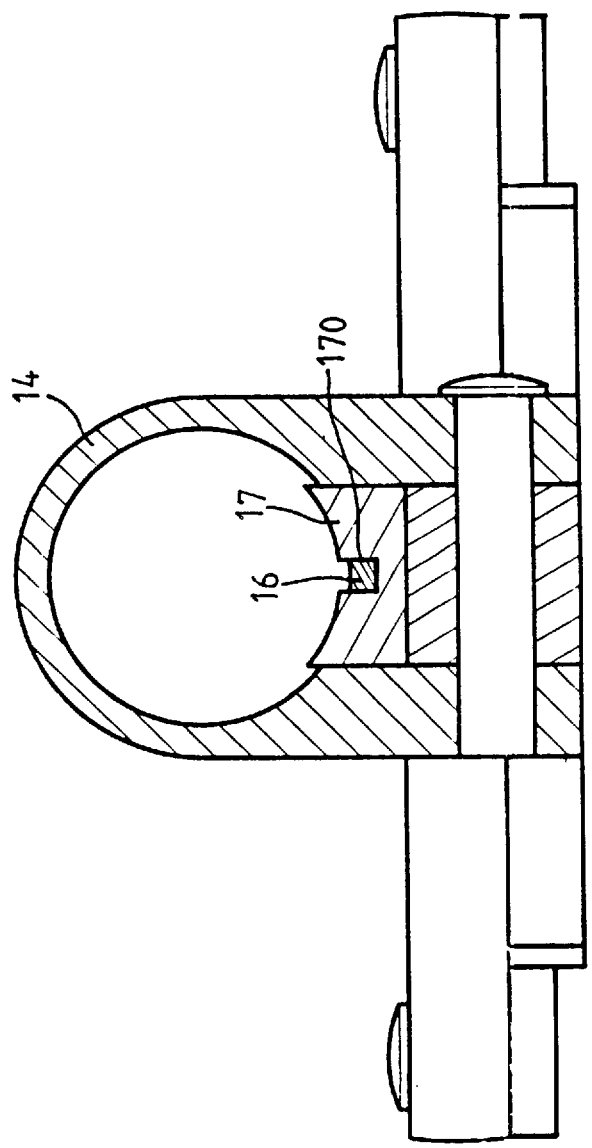
FIG. 2 is a schematic view illustrating the prior art interchangeable head at work.
Figure 3:
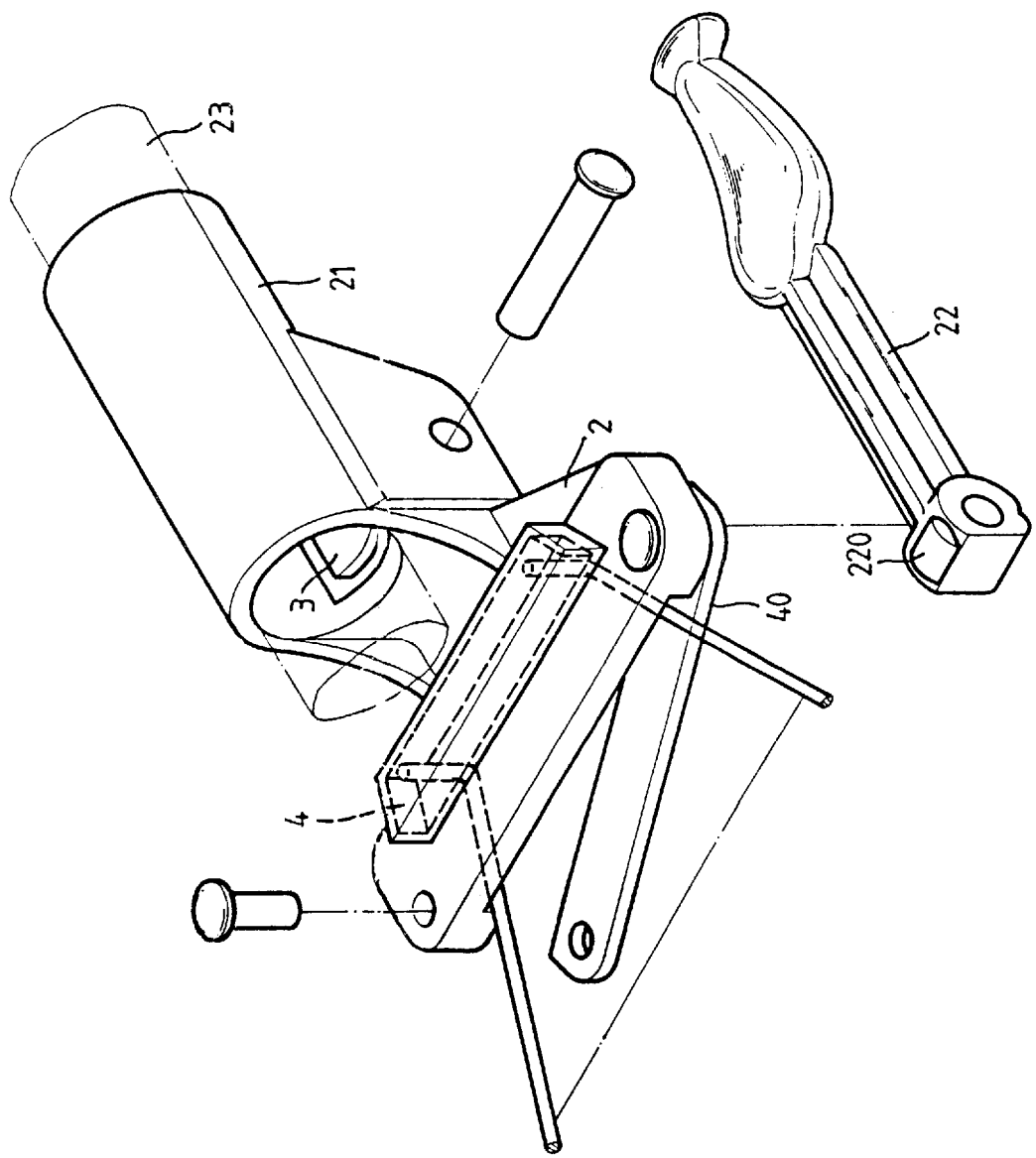
FIG. 3 shows an exploded view of a interchangeable head of the rake according to the present invention.
Figure 4:
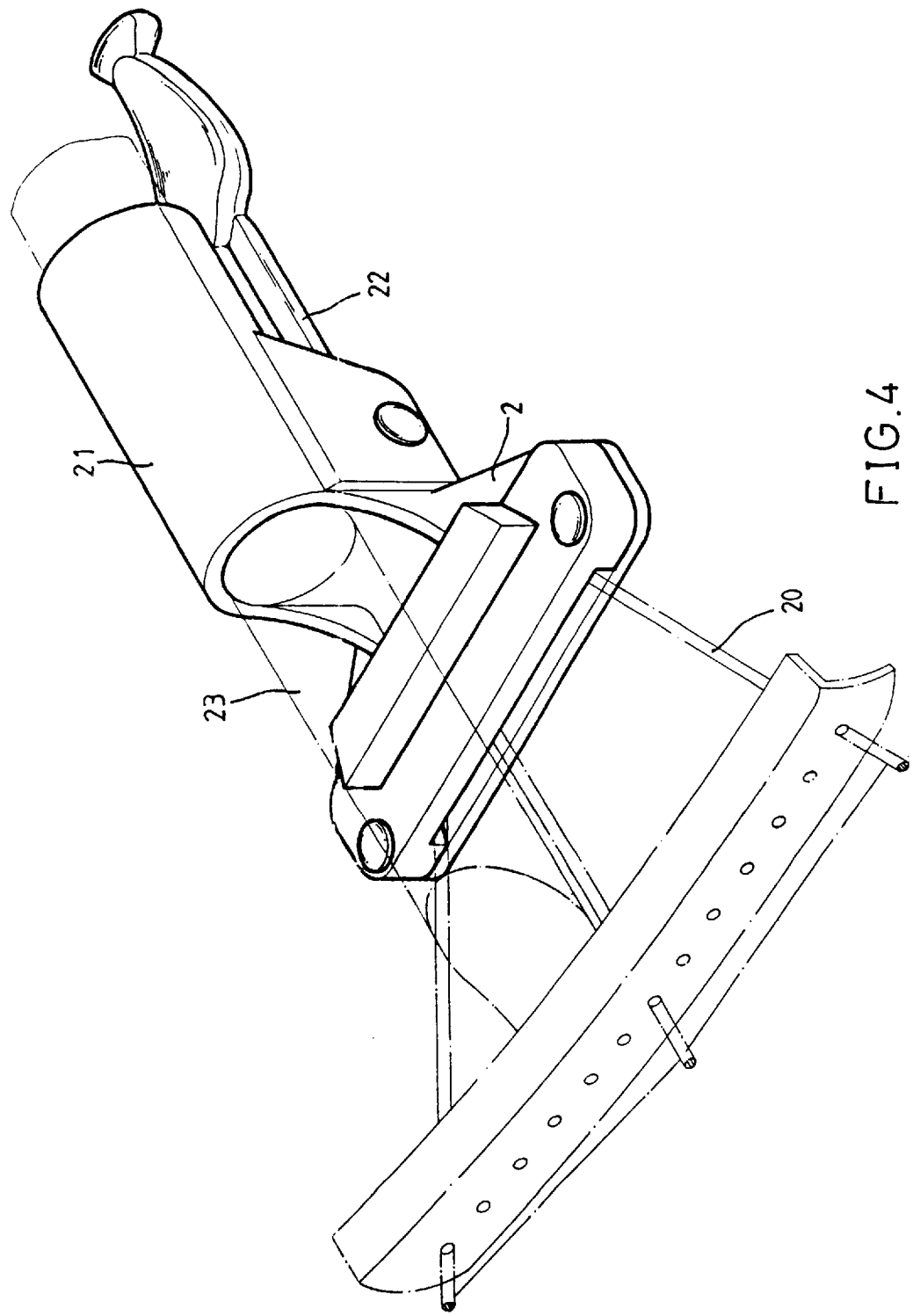
FIG. 4 shows a perspective view of the interchangeable head in combination according to the present invention.

As illustrated in FIGS. 3 and 4, a interchangeable rake head embodied in the present invention is composed of a main body 2 having a plurality of prongs 20 attached thereto for gathering loose grass, hay, leaves, etc. The main body 2 has a neck 21 opposite in location to the prongs 20. A movable press rod 22 is fastened pivotally along the direction of an axis of the neck 21. The press rod 22 has a protruded surface 220. A handle 23 is fastened with the neck 21 such that the handle 23 is movable in relation to the neck 21. The main body 2 is provided with a press rod 22 capable of bringing about a locating effect.

Figure 5:
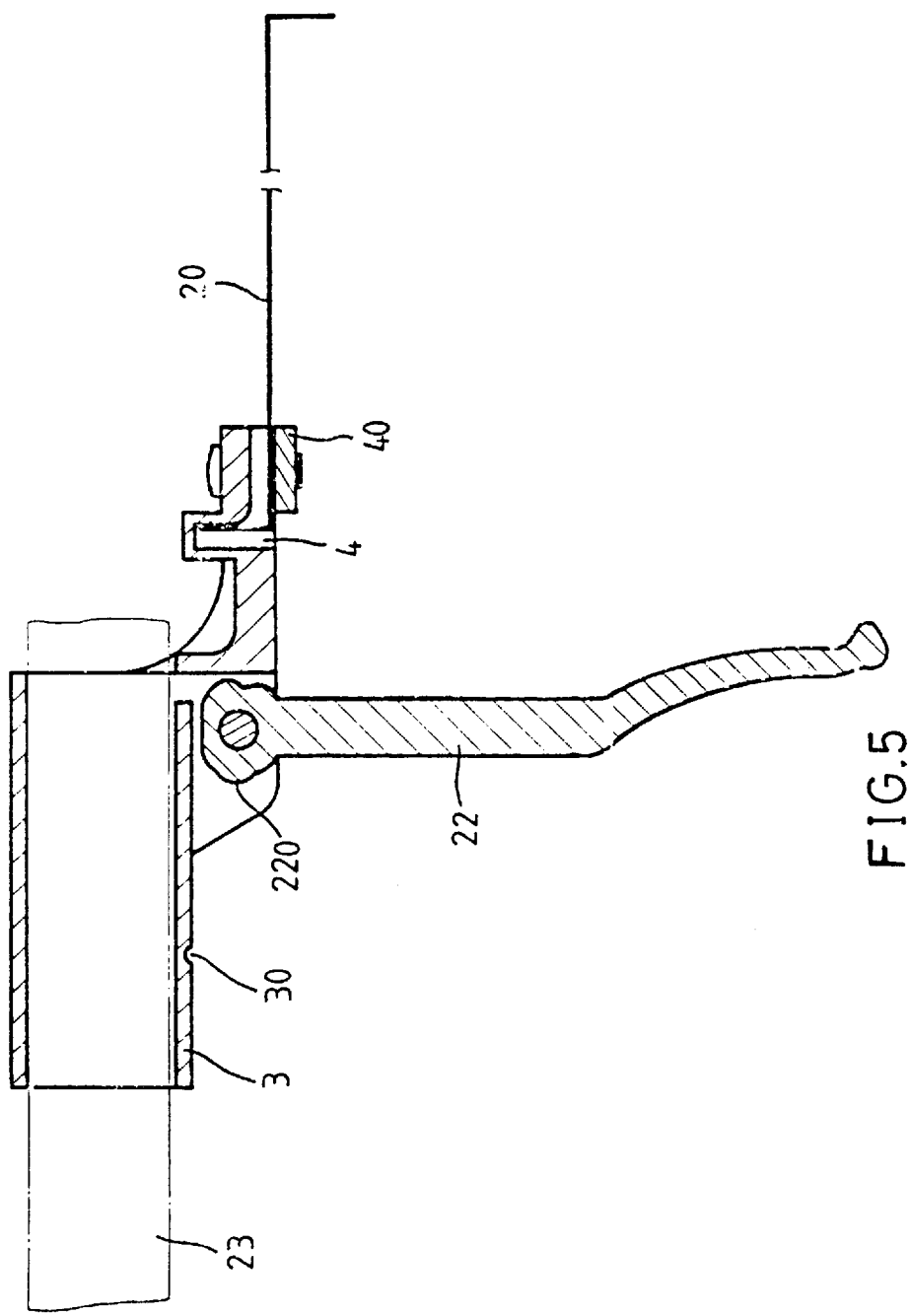
FIG. 5 is a schematic view illustrating the interchangeable head in action according to the present invention.

The neck 21 of the main body 2 is provided with a movable press piece 3, as shown in FIG. 5. The press piece 3 is provided at the fixed end thereof with a groove 30 to facilitate the moving of the press piece 3. The press rod 22 is fastened Pivotally with the press piece 3.

Figure 6:
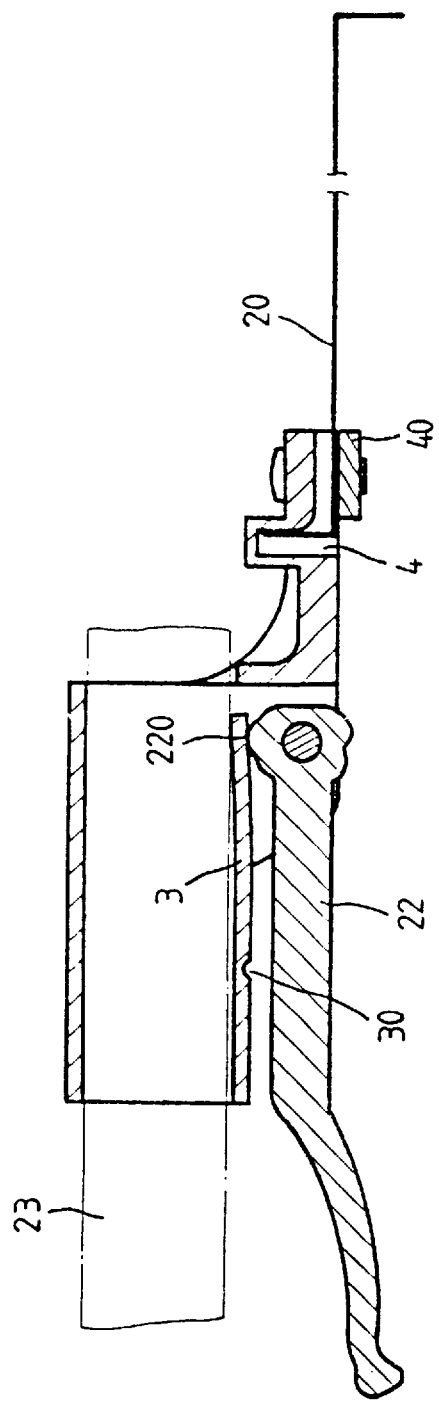
FIG. 6 is another schematic view illustrating the interchangeable head in action according to the present invention.

The main body 2 can be actuated to be removed from the handle 23 by moving the press rod 22 such that the protruded surface 220 of the press rod 22 is moved away from the press piece 3 so as to result in the disengagement of the neck 21 from the handle 23. As a result, the main body 2 can be interchangeabled as desired. After the main body 2 is located at a desired position, the press rod 22 is moved once again such that the protruded surface 220 of the press rod 22 is pressed against the press piece 3, as shown in FIG. 6, so as to force the press piece 3 to swivel towards the inner side of the neck 21 to press against the handle 23.

The locating effect of the handle 23 is attained by the press picec 3 in conjunction with the press rod 22 according to the present invention. The similar effect of locating the handle 19 of the prior art is accomplished by the support section 16 located in the mounting hole 15 of the neck 14, the press block 17, and the press rod 18. It is therefore readily apparent that the present invention is relatively simple in construction and is therefore more cost-effective than the prior art. In addition, the main body 2 of the present invention is provided with a protective slot 4 for enclosing the pointed ends of the prongs 20. as shown in FIGS. 3 and 4. The prongs 20 are located by a press board 40.

The embodiment of the present invention described above is to be regarded in all respects as being merely illustrative and not restrictive. Accordingly, the present invention may be embodied in other specific forms without deviating from the spirit thereof. The present invention is therefore to be limited only by the scope of the following appended claims.

What is claimed is:

1. An interchangeable head of a rake comprising a main body having a plurality of prongs attached thereto, said main body further having a neck means opposite in location to said plurality of prongs, said neck means for fastening said main body to a rake handle, said neck means having a movable press rod pivotally connected at one end to said neck means, said movable press rod being movable between a first position adjacent a bottom of said neck means and a second position angularly offset from said bottom, said movable press rod having a protruded surface at an area of the pivotal connection with said neck means, said bottom of said neck means of said main body having a movable press piece thereon; said press piece in securing contact with the handle when said movable press rod is in said first position. said press piece releasing from the securing contact when said movable press rod is in said second position, said main body having a protective slot means thereon for enclosing pointed ends of said plurality of prongs.

2. The interchangeable head as defined in claim 1, wherein said press piece has a fixed end having a groove to facilitate the moving of said press piece between the securing contact and the releasing of the security contact.

* * * * *